United States Patent
Fujiwara

(10) Patent No.: US 10,738,186 B2
(45) Date of Patent: Aug. 11, 2020

(54) VINYL CHLORIDE RESIN COMPOSITION, VINYL CHLORIDE RESIN MOLDED PRODUCT, AND LAMINATE

(71) Applicant: ZEON CORPORATION, Chiyoda-ku, Tokyo (JP)

(72) Inventor: Takanori Fujiwara, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 81 days.

(21) Appl. No.: 16/061,453

(22) PCT Filed: Dec. 7, 2016

(86) PCT No.: PCT/JP2016/086446
§ 371 (c)(1),
(2) Date: Jun. 12, 2018

(87) PCT Pub. No.: WO2017/110479
PCT Pub. Date: Jun. 29, 2017

(65) Prior Publication Data
US 2019/0225789 A1    Jul. 25, 2019

(30) Foreign Application Priority Data

Dec. 25, 2015  (JP) ................. 2015-255222

(51) Int. Cl.

| | | |
|---|---|---|
| *C08L 27/06* | (2006.01) | |
| *C08K 5/00* | (2006.01) | |
| *C08K 5/11* | (2006.01) | |
| *C08K 5/092* | (2006.01) | |
| *B29C 41/18* | (2006.01) | |
| *B32B 27/40* | (2006.01) | |
| *C08K 5/103* | (2006.01) | |
| *C08K 5/12* | (2006.01) | |
| *B32B 27/30* | (2006.01) | |
| *B32B 5/18* | (2006.01) | |
| *B29K 27/06* | (2006.01) | |

(52) U.S. Cl.
CPC .............. *C08L 27/06* (2013.01); *B29C 41/18* (2013.01); *B32B 5/18* (2013.01); *B32B 27/30* (2013.01); *B32B 27/40* (2013.01); *C08K 5/0016* (2013.01); *C08K 5/092* (2013.01); *C08K 5/103* (2013.01); *C08K 5/11* (2013.01); *C08K 5/12* (2013.01); *B29K 2027/06* (2013.01); *B32B 27/304* (2013.01)

(58) Field of Classification Search
CPC .. C08L 27/06; C08K 5/00; C08K 5/11; C08K 5/092; B29C 41/18
USPC ...................................................... 524/298
See application file for complete search history.

(56) References Cited

U.S. PATENT DOCUMENTS

| | | | | |
|---|---|---|---|---|
| 3,211,561 A | * | 10/1965 | Gearhart | .................. C08K 5/10 106/169.39 |
| 3,578,621 A | * | 5/1971 | Stapfer et al. | ..... C08G 59/4207 524/306 |
| 4,675,356 A | | 6/1987 | Miyata | |
| 2013/0089728 A1 | * | 4/2013 | Kobayashi | ............ B32B 27/304 428/319.3 |
| 2016/0288463 A1 | | 10/2016 | Fujiwara | |
| 2017/0008252 A1 | | 1/2017 | Fujiwara | |

FOREIGN PATENT DOCUMENTS

| | | |
|---|---|---|
| EP | 3121228 A1 | 1/2017 |
| JP | S5622327 A | 3/1981 |
| JP | S5622328 A | 3/1981 |

(Continued)

OTHER PUBLICATIONS

Jun. 26, 2018, International Preliminary Report on Patentability issued in the International Patent Application No. PCT/JP2016/086446.

(Continued)

Primary Examiner — Deve V Hall
(74) Attorney, Agent, or Firm — Kenja IP Law PC

(57) ABSTRACT

A vinyl chloride resin composition comprises: (a) a vinyl chloride resin; (b) a diester plasticizer formed from a compound represented by the following predetermined formula (1)

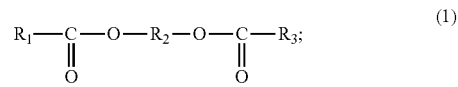

and
(c) a trimellitate plasticizer formed from a compound represented by the following formula (2):

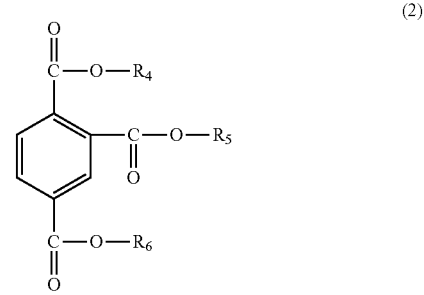

where $R_4$, $R_5$, and $R_6$ are alkyl groups that may be the same or different, and a straight chain ratio of each of $R_4$, $R_5$, and $R_6$ is less than 90 mol %.

13 Claims, No Drawings

(56) References Cited

FOREIGN PATENT DOCUMENTS

| | | |
|---|---|---|
| JP | S61174270 A | 8/1986 |
| JP | 2014189688 A | 10/2014 |
| WO | 2015087522 A1 | 6/2015 |
| WO | 2015141171 A1 | 9/2015 |

OTHER PUBLICATIONS

Jul. 9, 2019, The Extended European Search Report issued by the European Patent Office in the corresponding European Patent Application No. 16878372.8.
Database WPI Week 201467 Thomson Scientific, London, GB; AN 2014-S00068, XP002792486, 2014.
Mar. 7, 2017, International Search Report issued in the International Patent Application No. PCT/JP2016/086446.

* cited by examiner

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

An automobile instrument panel has a layered structure in which a foamed polyurethane layer is disposed between a substrate and a molded product such as a surface skin formed from a vinyl chloride resin.

Such an automobile instrument panel is required to have excellent flexibility at low temperatures so that, for example upon expansion of an air bag, the molded product part formed from the vinyl chloride resin can break as designed even at low temperatures without fragments of the molded product part being scattered.

Moreover, the vinyl chloride resin molded product forming such an automobile instrument panel is required to have excellent strength even at low temperatures so that the automobile instrument panel is not easily damaged during normal driving.

In recent years, for example, there have been attempts to improve vinyl chloride resin compositions suitable for use in production of automobile instrument panels.

For example, PTL 1 discloses a vinyl chloride resin composition including a vinyl chloride resin, a trimellitate plasticizer formed only from straight chain alkyl groups, and a diester plasticizer such as 1,9-nonanediol diester. This vinyl chloride resin composition described in PTL 1 enables formation of a molded product having excellent flexibility at low temperatures. Thus, in conventional studies of vinyl chloride resin compositions, in the case of using a trimellitate compound as a plasticizer, a trimellitate compound formed only from straight chain alkyl groups has been typically used.

CITATION LIST

Patent Literature

PTL 1: WO 2015/087522 A1

SUMMARY

Technical Problem

Vinyl chloride resin molded products need to have both favorable flexibility and favorable strength. Therefore, there is still room for improvement over the vinyl chloride resin composition described in PTL 1 in terms of control for improving and maintaining not only flexibility at low temperatures but also strength at low temperatures.

It could therefore be helpful to provide a vinyl chloride resin molded product and a laminate controllable to achieve both excellent strength at low temperatures and excellent flexibility at low temperatures, and a vinyl chloride resin composition that enables production of the vinyl chloride resin molded product and the laminate.

Solution to Problem

Through extensive studies, the inventor discovered that, by using a predetermined diester plasticizer having a branched chain structure and a predetermined trimellitate plasticizer in combination as plasticizers in preparation of a vinyl chloride resin composition, the strength (tensile stress, tensile breaking elongation) and the flexibility (tensile breaking elongation, loss modulus peak top temperature) at low temperatures of a vinyl chloride resin molded product yielded using the composition can be favorably controlled.

A presently disclosed vinyl chloride resin composition comprises: (a) a vinyl chloride resin; (b) a diester plasticizer formed from a compound represented by the following formula (1)

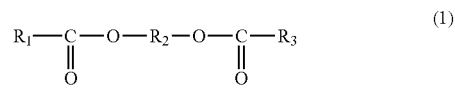

where $R_1$ and $R_3$ are monovalent hydrocarbon groups that may be the same or different, and $R_2$ is a divalent hydrocarbon group; and (c) a trimellitate plasticizer formed from a compound represented by the following formula (2):

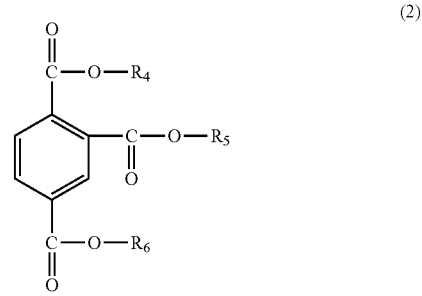

where $R_4$, $R_5$, and $R_6$ are alkyl groups that may be the same or different, and a straight chain ratio of each of $R_4$, $R_5$, and $R_6$ is less than 90 mol %. The vinyl chloride resin composition prepared using the predetermined diester plasticizer and the predetermined trimellitate plasticizer in combination in this way can be used in production of a vinyl chloride resin molded product through such control that achieves both strength and flexibility, such as excellent tensile characteristics at low temperatures.

In the present disclosure, the "straight chain ratio of $R_4$" in formula (2) denotes the proportion (mol %) of straight chain alkyl groups relative to all $R_4$ of the trimellitate compound included as a plasticizer in the vinyl chloride resin composition. The same applies to the "straight chain ratio of $R_5$" and the "straight chain ratio of $R_6$". Each "straight chain ratio" may be measured, for example, using liquid chromatography, without being limited thereto.

Preferably, in the vinyl chloride resin composition, relative to a total of the alkyl groups of $R_4$, $R_5$, and $R_6$ in the formula (2): a total proportion of alkyl groups having a carbon number of 7 or less is 0 mol % or more and 10 mol % or less; a total proportion of alkyl groups having a carbon number of 8 and a carbon number of 9 is 5 mol % or more and 100 mol % or less; a proportion of an alkyl group having a carbon number of 10 is 0 mol % or more and 95 mol % or less; and a total proportion of alkyl groups having a carbon number of 11 or more is 0 mol % or more and 10 mol % or less. As a result of the trimellitate plasticizer in the vinyl chloride resin composition containing predetermined alkyl groups at predetermined proportions in this way, a vinyl chloride resin molded product yielded using the vinyl chloride resin composition can further exhibit excellent strength and flexibility at low temperatures.

In the present disclosure, the "proportion of an alkyl group" having each carbon number may be measured, for example, using liquid chromatography, without being limited thereto.

Preferably, in the vinyl chloride resin composition, a total blending amount of (b) the diester plasticizer and (c) the trimellitate plasticizer relative to 100 parts by mass of (a) the vinyl chloride resin is 5 parts by mass or more and 200 parts by mass or less. As a result of the total blending amount of (b) the diester plasticizer and (c) the trimellitate plasticizer in the vinyl chloride resin composition being not less than the aforementioned lower limit, the vinyl chloride resin molded product yielded using the vinyl chloride resin composition can be further improved in flexibility at low temperatures. As a result of the total blending amount of the plasticizers being not more than the aforementioned upper limit, the vinyl chloride resin molded product yielded using the vinyl chloride resin composition can be further improved in strength at low temperatures.

Preferably, in the vinyl chloride resin composition, a blending ratio of (b) the diester plasticizer relative to (c) the trimellitate plasticizer, expressed as a mass ratio, is from 1/99 to 99/1. As a result of the blending ratio of (b) the diester plasticizer and (c) the trimellitate plasticizer in the vinyl chloride resin composition being in this range, the vinyl chloride resin molded product yielded using the vinyl chloride resin composition can be further improved in strength and flexibility at low temperatures.

Preferably, in the vinyl chloride resin composition, $R_1$ and $R_3$ in the formula (1) are monovalent aliphatic hydrocarbon groups having a carbon number of 2 to 24, and $R_2$ in the formula (1) is a divalent aliphatic hydrocarbon group having a carbon number of 2 to 15. As a result of the carbon number of each hydrocarbon group of the diester plasticizer included in the vinyl chloride resin composition being not less than the aforementioned lower limit, the vinyl chloride resin molded product yielded using the vinyl chloride resin composition can be further improved in flexibility at low temperatures. As a result of the carbon number of each hydrocarbon group of the diester plasticizer included in the vinyl chloride resin composition being not more than the aforementioned upper limit, the vinyl chloride resin molded product yielded using the vinyl chloride resin composition can be further improved in strength at low temperatures.

In the present disclosure, the "carbon number of an aliphatic hydrocarbon group" for each of $R_1$ to $R_3$ may be measured, for example, using liquid chromatography, without being limited thereto.

Preferably, in the vinyl chloride resin composition, a straight chain ratio of $R_2$ in the formula (1) is 90 mol % or more, and a total straight chain ratio of $R_1$ and $R_3$ in the formula (1) is 90 mol % or more. As a result of the straight chain ratios of $R_1$ to $R_3$ of the diester compound included in the vinyl chloride resin composition being as described above, the vinyl chloride resin molded product yielded using the vinyl chloride resin composition can be further improved in strength and flexibility at low temperatures.

In the present disclosure, the "straight chain ratio of $R_2$" in formula (1) denotes the proportion (mol %) of straight chain alkyl groups relative to all $R_2$ of the diester compound included as a plasticizer in the vinyl chloride resin composition. The "total straight chain ratio of $R_1$ and $R_3$" denotes the proportion (mol %) of straight chain alkyl groups relative to all $R_1$ and $R_3$ of the diester compound included as a plasticizer in the vinyl chloride resin composition.

Preferably, in the vinyl chloride resin composition, (a) the vinyl chloride resin is vinyl chloride resin particles. As a result of (a) the vinyl chloride resin being in particulate form, for example, the vinyl chloride resin molded product as an automobile interior material used in an automobile interior part such as an automobile instrument panel can be produced favorably.

Preferably, the vinyl chloride resin composition is used in powder molding. The use of the vinyl chloride resin composition in particulate form for powder molding enables, for example, more favorable production of the vinyl chloride resin molded product as an automobile interior material used in an automobile interior part such as an automobile instrument panel.

Preferably, the vinyl chloride resin composition is used in powder slush molding. The use of the vinyl chloride resin composition in particulate form for powder slush molding enables, for example, further favorable production of the vinyl chloride resin molded product as an automobile interior material used in an automobile interior part such as an automobile instrument panel.

A presently disclosed vinyl chloride resin molded product is obtainable through powder slush molding of the vinyl chloride resin composition described above. By forming the vinyl chloride resin molded product through powder slush molding of the vinyl chloride resin composition including the aforementioned two types of predetermined plasticizers, such control that improves and maintains strength and flexibility at low temperatures is possible, so that the resultant vinyl chloride resin molded product has excellent strength and flexibility.

Preferably, the vinyl chloride resin molded product is used as a surface skin of an automobile instrument panel. As a result of the vinyl chloride resin molded product being used as a surface skin of an automobile instrument panel, the resultant surface skin of the automobile instrument panel exhibits excellent strength and flexibility at low temperatures. Hence, a surface skin for an automobile instrument panel excellent in durability, which has strength that resists damage such as cracking even at low temperatures and has flexibility that allows an air bag to expand without fragments and the like being scattered, can be obtained.

A presently disclosed laminate comprises: a foamed polyurethane molded product; and the vinyl chloride resin molded product described above. As a result of the laminate formed using the foamed polyurethane molded product and the vinyl chloride resin molded product being used, for example, in production of an automobile interior part such as an automobile instrument panel, the automobile interior part such as an automobile instrument panel can be controlled to exhibit excellent strength and flexibility at low temperatures. Hence, an automobile interior part such as an automobile instrument panel excellent in toughness, which has flexibility of breaking as designed upon expansion of an air bag while maintaining strength that resists damage even at low temperatures, can be obtained.

Advantageous Effect

It is therefore possible to provide a vinyl chloride resin molded product and a laminate controllable to achieve both excellent strength at low temperatures and excellent flexibility at low temperatures, and a vinyl chloride resin composition that enables production of the vinyl chloride resin molded product and the laminate.

DETAILED DESCRIPTION

One of the disclosed embodiments is described in detail below.

A presently disclosed vinyl chloride resin composition can be used in production of a vinyl chloride resin molded product and a laminate including the vinyl chloride resin molded product. The vinyl chloride resin molded product may be produced using the presently disclosed vinyl chloride resin composition by, for example, powder molding such as powder slush molding. The vinyl chloride resin molded product and the laminate may be used as, for example, an automobile interior material forming an automobile interior part, such as a surface skin for an automobile instrument panel.

Vinyl Chloride Resin Composition

The presently disclosed vinyl chloride resin composition comprises: (a) a vinyl chloride resin; (b) a diester plasticizer formed from a predetermined compound; and (c) a trimellitate plasticizer formed from a compound having alkyl groups of a predetermined straight chain ratio, and further optionally contains additives such as other plasticizers.

The presently disclosed vinyl chloride resin composition uses the aforementioned two types of predetermined plasticizers in combination. Accordingly, for example, a vinyl chloride resin molded product yielded using the vinyl chloride resin composition can be adjusted to exhibit high strength and high flexibility at low temperatures.

(a) Vinyl Chloride Resin

<<Composition>>

Examples of (a) the vinyl chloride resin include homopolymers composed of vinyl chloride units, and copolymers preferably containing 50 mass % or more of vinyl chloride units and more preferably 70 mass % or more of vinyl chloride units. Specific examples of monomers (comonomers) copolymerizable with vinyl chloride of vinyl chloride copolymers include: olefins such as ethylene and propylene; halogenated olefins such as allyl chloride, vinylidene chloride, vinyl fluoride, and trifluorochloroethylene; carboxylic acid vinyl esters such as vinyl acetate and vinyl propionate; vinyl ethers such as isobutyl vinyl ether and cetyl vinyl ether; allyl ethers such as allyl-3-chloro-2-oxy propyl ether and allyl glycidyl ether; unsaturated carboxylic acids, esters of unsaturated carboxylic acids, and acid anhydrides of unsaturated carboxylic acids such as acrylic acid, maleic acid, itaconic acid, acrylic acid-2-hydroxyethyl, methyl methacrylate, monomethyl maleate, diethyl maleate, and maleic anhydride; unsaturated nitriles such as acrylonitrile and methacrylonitrile; acrylamides such as acrylamide, N-methylolacrylamide, acrylamido-2-methylpropane sulfonic acid, and (meth)acrylamidopropyltrimethylammonium chloride; and allyl amines and derivatives thereof such as allylamine benzoate and diallyldimethylammonium chloride. The above examples of monomers are merely some of the monomers (comonomers) that are copolymerizable with vinyl chloride. Further examples of various types of monomers that can be used as comonomers are provided in pages 75-104 of "Polyvinyl chloride" edited by the Vinyl Section of the Kinki Chemical Society Japan and published by Nikkan Kogyo Shimbun, Ltd. (1988). Any one of these monomers or any two or more of these monomers may be used. Moreover, (a) the vinyl chloride resin may include a resin formed by graft polymerization of (1) vinyl chloride or (2) vinyl chloride and a comonomer such as described above copolymerizable with vinyl chloride, with a resin such as an ethylene-vinyl acetate copolymer, an ethylene-methyl methacrylate copolymer, an ethylene-ethyl acrylate copolymer, or a chlorinated polyethylene.

The present description uses the term "(meth)acryl" to refer to either or both of acryl and methacryl.

Conventionally known production methods such as suspension polymerization, emulsion polymerization, solution polymerization, and bulk polymerization can be used to produce (a) the vinyl chloride resin.

Furthermore, (a) the vinyl chloride resin may be a single type of vinyl chloride resin or a mixture of two or more types of vinyl chloride resins. Specifically, (a) the vinyl chloride resin may be only a vinyl chloride resin as a substrate when preparing the vinyl chloride resin composition (i.e. functioning as a matrix resin), or a mixture of a vinyl chloride resin as such a substrate and a vinyl chloride resin having a function other than a substrate. Examples of possible functions of the vinyl chloride resin other than the substrate include a dusting agent that can modify powder fluidity. It is preferable that (a) the vinyl chloride resin is a combination of the vinyl chloride resin as the substrate and the vinyl chloride resin as the dusting agent. As the dusting agent, an optional component other than the vinyl chloride resin may be used, as described later. The vinyl chloride resin and the optional component other than the vinyl chloride resin may be used in combination.

It is preferable that the vinyl chloride resin as the substrate normally contained in (a) the vinyl chloride resin is produced by suspension polymerization, and the vinyl chloride resin as the dusting agent that may be contained in (a) the vinyl chloride resin is produced by emulsion polymerization.

<<Properties>>

Average Degree of Polymerization

The average degree of polymerization of a vinyl chloride resin forming (a) the vinyl chloride resin is preferably 800 or more and more preferably 900 or more, and preferably 5000 or less and more preferably 3000 or less. In the case where (a) the vinyl chloride resin is the vinyl chloride resin as the substrate, the average degree of polymerization of the vinyl chloride resin may be in the same range as above. Regarding the vinyl chloride resin as the dusting agent that may be contained in (a) the vinyl chloride resin, the average degree of polymerization of a vinyl chloride resin forming this vinyl chloride resin is preferably 500 or more and more preferably 700 or more, and preferably 2000 or less, more preferably 1500 or less, and further preferably 1200 or less.

As a result of the average degree of polymerization of (a) the vinyl chloride resin being 800 or more, a molded product obtained by, for example, powder molding the vinyl chloride resin composition including the vinyl chloride resin has favorable strength. As a result of the average degree of polymerization of (a) the vinyl chloride resin being 5000 or less, the molded product has favorable flexibility.

In the present disclosure, the "average degree of polymerization" can be measured in accordance with JIS K6720-2.

Form

It is preferable that (a) the vinyl chloride resin is vinyl chloride resin particles. In other words, (a) the vinyl chloride resin preferably has particulate form. In the case where (a) the vinyl chloride resin is the vinyl chloride resin as the substrate, too, the vinyl chloride resin preferably has particulate form. The vinyl chloride resin as the dusting agent that may be contained in (a) the vinyl chloride resin also preferably has particulate form. More preferably, the vinyl chloride resin as the dusting agent is fine particles (vinyl chloride resin fine particles) finer than the vinyl chloride resin particles as the substrate.

As a result of (a) the vinyl chloride resin being vinyl chloride resin particles, the vinyl chloride resin composition including the vinyl chloride resin can be suitably used in powder molding such as powder slush molding. As a result of the vinyl chloride resin as the dusting agent being vinyl chloride resin fine particles, the powder fluidity of the vinyl chloride resin composition further including the vinyl chloride resin fine particles can be further improved.

The present description uses the term "resin particles" to refer to particles with a particle diameter of 30 μm or more, and the term "resin fine particles" to refer to particles with a particle diameter of less than 30 μm.

Average Particle Diameter

The average particle diameter of the vinyl chloride resin particles as (a) the vinyl chloride resin is not limited, and is preferably 50 μm or more and more preferably 100 μm or more, and preferably 500 μm or less, more preferably 250 μm or less, and further preferably 200 μm or less. In the case where the (a) the vinyl chloride resin is the vinyl chloride resin particles as the substrate, too, the average particle diameter of the vinyl chloride resin may be in the same range as above. As a result of the average particle diameter of the vinyl chloride resin particles being 50 μm or more, the strength of the vinyl chloride resin molded product including the vinyl chloride resin particles can be further improved. As a result of the average particle diameter of the vinyl chloride resin particles being 500 μm or less, the powder fluidity of the vinyl chloride resin composition including the vinyl chloride resin particles can be improved, which eases powder molding. Moreover, the smoothness of the vinyl chloride resin molded product obtained by powder molding the vinyl chloride resin composition can be improved.

The average particle diameter of the vinyl chloride resin fine particles as the dusting agent that may be contained in (a) the vinyl chloride resin is not limited, and is preferably 0.1 μm or more, and preferably 10 μm or less.

Thus, in the case where (a) the vinyl chloride resin includes two or more types of vinyl chloride resin particles (such as vinyl chloride resin particles and vinyl chloride resin fine particles), it is preferable that the two or more types of vinyl chloride resins differ in particle diameter.

In the present disclosure, the "average particle diameter of the vinyl chloride resin particles" can be measured in accordance with a sieving method using a JIS standard sieve prescribed by JIS Z8801. In the present disclosure, the "average particle diameter of the vinyl chloride resin fine particles" can be measured by a laser diffraction method in accordance with JIS Z8825 using, for example, a laser diffraction particle size analyzer (product name "SALD-2300" produced by Shimadzu Corporation).

<<Blending Proportion>>

In the case where (a) the vinyl chloride resin includes, for example, both the vinyl chloride resin particles as the substrate and the vinyl chloride resin fine particles as the dusting agent, the content of the vinyl chloride resin particles as the substrate in 100 mass % of (a) the vinyl chloride resin is typically 70 mass % or more, preferably more than 70 mass %, more preferably 75 mass % or more, and further preferably 80 mass % or more, and is less than 100 mass %, preferably 99 mass % or less, more preferably 95 mass % or less, and further preferably 92 mass % or less.

In the case where (a) the vinyl chloride resin includes, for example, both the vinyl chloride resin particles as the substrate and the vinyl chloride resin fine particles as the dusting agent, the content of the vinyl chloride resin fine particles as the dusting agent in 100 mass % of (a) the vinyl chloride resin is more than 0 mass %, preferably 1 mass % or more, more preferably 5 mass % or more, and further preferably 8 mass % or more, and is typically 30 mass % or less, preferably 25 mass % or less, and more preferably 20 mass % or less.

Plasticizer

The presently disclosed vinyl chloride resin composition includes, as plasticizers, (b) a predetermined diester plasticizer, and (c) a trimellitate plasticizer having alkyl groups of a predetermined straight chain ratio, and may optionally include plasticizers other than (b) the diester plasticizer and (c) the trimellitate plasticizer.

Although the form of each plasticizer is not limited, the plasticizer is preferably liquid at ordinary temperatures, in terms of easiness of mixture with (a) the vinyl chloride resin and also in terms of suppressing blooming on the surface of the produced vinyl chloride resin molded product (a phenomenon that ingredients precipitate on the molded product surface and turn the surface white). By appropriately selecting the types of hydrocarbon groups such as $R_1$ and $R_3$ of (b) the diester plasticizer described below, the plasticizer can be made in desired form.

(b) Diester Plasticizer (b) The diester plasticizer included in the presently disclosed vinyl chloride resin composition is formed from a compound represented by the following formula (1):

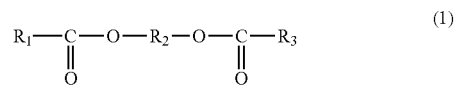

$$R_1-\underset{\underset{O}{\|}}{C}-O-R_2-O-\underset{\underset{O}{\|}}{C}-R_3 \qquad (1)$$

In formula (1), $R_1$ and $R_3$ need to be monovalent hydrocarbon groups, and are preferably monovalent aliphatic hydrocarbon groups and more preferably monovalent straight chain hydrocarbon groups. $R_1$ and $R_3$ may be the same or different. In formula (1), $R_2$ needs to be a divalent hydrocarbon group, and is preferably a divalent aliphatic hydrocarbon group, more preferably a divalent straight chain hydrocarbon group, and further preferably a divalent straight chain saturated hydrocarbon group.

Type of Hydrocarbon Group

The hydrocarbon groups forming $R_1$ and $R_3$ in formula (1) are not limited. Examples include:

straight chain saturated hydrocarbon groups such as a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, and an n-stearyl group;

branched saturated hydrocarbon groups such as an i-propyl group, an i-butyl group, an i-pentyl group, an i-hexyl group, an i-heptyl group, an i-octyl group, an i-nonyl group, an i-decyl group, an i-undecyl group, an i-dodecyl group, an i-tridecyl group, an i-tetradecyl group, an i-pentadecyl group, an i-hexadecyl group, an i-heptadecyl group, an i-octadecyl group, a t-butyl group, a t-pentyl group, a t-hexyl group, a t-heptyl group, a t-octyl group, a t-nonyl group, a t-decyl group, a t-undecyl group, a t-dodecyl group, a t-tridecyl group, a t-tetradecyl group, a t-pentadecyl group, a t-hexadecyl group, a t-heptadecyl group, a t-octadecyl group, and a 2-ethylhexyl group; and unsaturated hydrocarbon groups included in unsaturated carboxylic acid compounds such as sorbic acid, caproleic acid, linderic acid, myristoleic acid, palmitoleic acid, petroselinic acid, petroselaidic acid, oleic acid, elaidic acid, vaccenic acid, basenin acid, linolic acid, linolelaidic acid, linolenic acid, linolenelaidic acid, stearidonic acid, α-eleostearic acid, gondoic acid, gadoleic acid, arachidonic acid, eicosapentaenoic acid, paullinic acid, setoleic acid, erucic acid, clupanodonic acid, docosapentaenoic acid, docosahexaenoic acid, selacholeic acid, and nervonic acid.

Of these, straight chain hydrocarbon groups are preferable as $R_1$ and $R_3$. For example, straight chain unsaturated hydrocarbon groups in unsaturated carboxylic acid compounds such as oleic acid may be used. Any of synthetic compounds and natural compounds may be used. One of these hydrocarbon groups may be used individually, or two or more of these hydrocarbon groups may be used in combination.

The hydrocarbon group forming $R_2$ in formula (1) is not limited. An example is a hydrocarbon group obtained by removing one hydrogen atom from any of the aforementioned straight chain saturated hydrocarbon groups and branched saturated hydrocarbon groups. Of these, a straight chain saturated hydrocarbon group is preferable as $R_2$, and a straight chain saturated hydrocarbon group such as a hexamethylene group is more preferable.

Carbon Number of Hydrocarbon Group

The carbon number of the monovalent hydrocarbon group of $R_1$ in formula (1) is preferably 2 or more, more preferably 3 or more, further preferably 10 or more, and even more preferably 16 or more, and preferably 24 or less, more preferably 20 or less, and further preferably 19 or less.

Likewise, the carbon number of the monovalent hydrocarbon group of $R_3$ in formula (1) is preferably 2 or more, more preferably 3 or more, further preferably 10 or more, and even more preferably 16 or more, and preferably 24 or less, more preferably 20 or less, and further preferably 19 or less.

The carbon number of the divalent hydrocarbon group of $R_2$ in formula (1) is preferably 2 or more and more preferably 3 or more, and preferably 15 or less, more preferably 13 or less, and further preferably 10 or less.

As a result of the carbon number of each of $R_1$, $R_2$, and $R_3$ in formula (1) being 2 or more, the flexibility of the molded product yielded using the vinyl chloride resin composition including the diester plasticizer can be further enhanced. As a result of the carbon number of each of $R_1$ and $R_3$ in formula (1) being 24 or less and the carbon number of $R_2$ in formula (1) being 15 or less, the strength of the vinyl chloride resin molded product can be maintained favorably.

Straight Chain Ratio of Hydrocarbon Group

The straight chain ratio of the hydrocarbon group of $R_2$ and the straight chain ratio of the hydrocarbon groups of the total of $R_1$ and $R_3$ in formula (1) are each preferably 90 mol % or more, more preferably 95 mol % or more, and further preferably 100 mol %. In other words, it is preferable that all hydrocarbon groups of (b) the diester plasticizer included in the vinyl chloride resin composition are straight chain hydrocarbon groups. As a result of the hydrocarbon group of $R_2$ and the hydrocarbon groups of the total of $R_1$ and $R_3$ of (b) the diester plasticizer being each a hydrocarbon group with a straight chain ratio of 90 mol % or more, such control that further enhances the flexibility and tensile characteristics such as tensile stress and tensile breaking elongation at low temperatures of the vinyl chloride resin molded product yielded by powder molding such as powder slush molding can be achieved.

<<Trimellitate Plasticizer>>

(c) The trimellitate plasticizer included in the presently disclosed vinyl chloride resin composition is formed from a compound represented by the following formula (2):

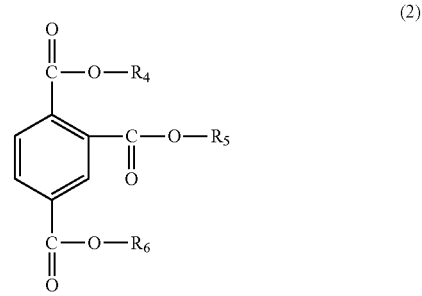

In formula (2), $R_4$, $R_5$, and $R_6$ need to be alkyl groups. To satisfy the below-mentioned predetermined straight chain ratio, at least part of each of $R_4$, $R_5$, and $R_6$ in the vinyl chloride resin composition is a branched alkyl group. It is preferable that all of $R_4$, $R_5$, and $R_6$ in the composition are branched alkyl groups. $R_4$, $R_5$, and $R_6$ may be the same or different. In other words, it is preferable that all alkyl groups of (c) the trimellitate plasticizer included in the vinyl chloride resin composition are branched alkyl groups.

Straight Chain Ratio of Alkyl Group

The straight chain ratio of each of $R_4$, $R_5$, and $R_6$ in formula (2) needs to be less than 90 mol %, and is preferably 50 mol % or less, more preferably 20 mol % or less, and further preferably 0 mol %. As a result of each of $R_4$, $R_5$, and $R_6$ of the trimellitate compound forming (c) the trimellitate plasticizer being an alkyl group with a straight chain ratio of less than 90 mol %, the vinyl chloride resin molded product yielded using (c) the trimellitate plasticizer and (b) the diester plasticizer in combination can be provided with favorable flexibility, and also the vinyl chloride resin molded product can be provided with excellent tensile characteristics such as tensile stress and tensile breaking elongation at low temperatures, and favorable strength. In other words, the use of (c) the predetermined trimellitate plasticizer and (b) the predetermined diester plasticizer in preparation of the vinyl chloride resin composition enables control of the flexibility and strength of the produced vinyl chloride resin molded product.

Although the reason that, in the case where (c) the trimellitate plasticizer having a predetermined low straight chain ratio and (b) the diester plasticizer are used in combination, the flexibility and strength of the vinyl chloride resin molded product containing these plasticizers can be controlled has not yet been clarified, the reason is presumed to be as follows.

The trimellitate compound forming (c) the trimellitate plasticizer included in the vinyl chloride resin composition serves as a first plasticizer, by entering between polymer chains of the vinyl chloride resin in the composition. As a result, the distance between polymer chains of the vinyl chloride resin increases with the trimellitate compound therebetween, so that the flexibility of the vinyl chloride resin composition increases. Since the straight chain ratio of the alkyl groups of (c) the trimellitate plasticizer is less than 90 mol %, the distance between polymer chains of the vinyl chloride resin is kept short as compared with the case where a trimellitate plasticizer with a straight chain ratio of 90 mol % or more is contained, and therefore high strength of the produced vinyl chloride resin molded product can be maintained.

Here, in the case where (b) the diester plasticizer is further used in the vinyl chloride resin composition, (b) the diester plasticizer having a different degree of plasticization effect from (c) the trimellitate plasticizer serves as a second plasticizer that can adjust the plasticization degree of the composition. Hence, by adjusting the compositions, blending amounts, etc. of (b) the diester plasticizer and (c) the trimellitate plasticizer, the effect of combined use of a plurality of types of plasticizers that differ in the degree of plasticization action is achieved, with it being possible to control the flexibility and strength of the vinyl chloride resin molded product obtained by powder molding or the like as desired. This effect of controlling the properties of the vinyl chloride resin molded product by combined use of the first and second plasticizers, etc. is expected to be particularly high in the case where (b) the diester plasticizer and (c) the trimellitate plasticizer satisfy the respective suitable conditions defined in the present description. This is mainly because each plasticization action is sufficiently exerted in such a case.

Type of Alkyl Group (c) The trimellitate plasticizer is not limited as long as it has alkyl groups with the aforementioned predetermined straight chain ratio, and may be any ester compound of trimellitic acid and a monohydric alcohol.

Examples of the alkyl groups of (c) the trimellitate plasticizer include:

branched alkyl groups such as an i-propyl group, an i-butyl group, an i-pentyl group, an i-hexyl group, an i-heptyl group, an i-octyl group, an i-nonyl group, an i-decyl group, an i-undecyl group, an i-dodecyl group, an i-tridecyl group, an i-tetradecyl group, an i-pentadecyl group, an i-hexadecyl group, an i-heptadecyl group, an i-octadecyl group, a t-butyl group, a t-pentyl group, a t-hexyl group, a t-heptyl group, a t-octyl group, a t-nonyl group, a t-decyl group, a t-undecyl group, a t-dodecyl group, a t-tridecyl group, a t-tetradecyl group, a t-pentadecyl group, a t-hexadecyl group, a t-heptadecyl group, a t-octadecyl group, and a 2-ethylhexyl group; and straight chain alkyl groups such as a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, and an n-stearyl group.

(c) The trimellitate plasticizer may be a single compound or may be a mixture.

Carbon Number and Percentage Content of Alkyl Group

In the trimellitate compound forming (c) the trimellitate plasticizer, the total percentage content of alkyl groups having a carbon number of 7 or less is preferably 0 mol % or more and 10 mol % or less, relative to the total alkyl groups of $R_4$, $R_5$, and $R_6$ in formula (2). Thus, there may be no alkyl group having a carbon number of 1 or more and 7 or less, relative to the total alkyl groups of $R_4$, $R_5$, and $R_6$.

In the trimellitate compound forming (c) the trimellitate plasticizer, the total percentage content of alkyl groups having a carbon number of 8 and a carbon number of 9 is preferably 5 mol % or more and 100 mol % or less, relative to the total alkyl groups of $R_4$, $R_5$, and $R_6$ in formula (2). Thus, it is preferable that any alkyl group having a carbon number of 8 or 9 is present relative to the total alkyl groups of $R_4$, $R_5$, and $R_6$. Only an alkyl group having a carbon number of 8 may be present, only an alkyl group having a carbon number of 9 may be present, or only alkyl groups having carbon numbers of 8 and 9 may be present together. It is more preferable that the total percentage content of alkyl groups having a carbon number of 8 and a carbon number of 9 is 100 mol %.

In the trimellitate compound forming (c) the trimellitate plasticizer, the percentage content of an alkyl group having a carbon number of 10 is preferably 0 mol % or more and 95 mol % or less, relative to the total alkyl groups of $R_4$, $R_5$, and $R_6$ in formula (2). Thus, there may be no alkyl group having a carbon number of 10, relative to the total alkyl groups of $R_4$, $R_5$, and $R_6$.

In the trimellitate compound forming (c) the trimellitate plasticizer, the total percentage content of alkyl groups having a carbon number of 11 or more is preferably 0 mol % or more and 10 mol % or less, relative to the total alkyl groups of $R_4$, $R_5$, and $R_6$ in formula (2). Thus, there may be no alkyl group having a carbon number of 11 or more, relative to the total alkyl groups of $R_4$, $R_5$, and $R_6$.

As a result of (c) the trimellitate plasticizer having at least alkyl groups having a carbon number of 8 or 9 to some extent and preferably as a result of (c) the trimellitate plasticizer being formed only from alkyl groups with a carbon number of 8 or 9, such control that achieves a better balance between the flexibility and strength of the obtained vinyl chloride resin molded product is possible.

In the trimellitate compound forming (c) the trimellitate plasticizer, each of the alkyl groups of $R_4$, $R_5$, and $R_6$ in formula (2) preferably has a carbon number of 7 or more and more preferably has a carbon number of 8 or more, and preferably has a carbon number of 11 or less, more preferably has a carbon number of 10 or less, and further preferably has a carbon number of 9 or less. As a result of the carbon number being not less than the aforementioned lower limit, the flexibility of the obtained vinyl chloride resin molded product can be further improved. As a result of the carbon number being not more than the aforementioned upper limit, the strength of the obtained vinyl chloride resin molded product can be further improved.

Additives

Besides (a) the vinyl chloride resin, (b) the diester plasticizer, and (c) the trimellitate plasticizer, the vinyl chloride resin composition may include various additives. Although no specific limitations are placed on these additives, examples of additives that may be used include: plasticizers other than (b) the diester plasticizer and (c) the trimellitate plasticizer; stabilizers such as perchloric acid-treated hydrotalcite, zeolites, β-diketones, and fatty acid metal salts; dusting agents other than the vinyl chloride resin fine particles; and other additives.

<<Other Plasticizers>>

In addition to (b) the diester plasticizer and (c) the trimellitate plasticizer, any one or more other plasticizers (e.g. primary plasticizer, secondary plasticizer, etc.) may be used in the vinyl chloride resin composition. In a situation in which a secondary plasticizer is used, a primary plasticizer of equivalent or greater mass is preferably used in combination with the secondary plasticizer.

Examples of so-called primary plasticizers include:

pyromellitate plasticizers such as tetra-n-hexyl pyromellitate, tetra-n-heptyl pyromellitate, tetra-n-octyl pyromellitate, tetra(2-ethylhexyl) pyromellitate, tetra-n-nonyl pyromellitate, tetra-n-decyl pyromellitate, tetraisodecyl pyromellitate, tetra-n-undecyl pyromellitate, tetra-n-dodecyl pyromellitate, and tetra-n-alkyl pyromellitates (esters including two or more types of alkyl groups having differing carbon numbers of 6 to 12 in molecules thereof);

phthalic acid derivatives such as dimethyl phthalate, diethyl phthalate, dibutyl phthalate, di(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate;

isophthalic acid derivatives such as dimethyl isophthalate, di(2-ethylhexyl) isophthalate, and diisooctyl isophthalate;

tetrahydrophthalic acid derivatives such as di(2-ethylhexyl) tetrahydrophthalate, di-n-octyl tetrahydrophthalate, and diisodecyl tetrahydrophthalate;

adipic acid derivatives such as di-n-butyl adipate, di(2-ethylhexyl) adipate, diisodecyl adipate, and diisononyl adipate;

azelaic acid derivatives such as di(2-ethylhexyl) azelate, diisooctyl azelate, and di-n-hexyl azelate;

sebacic acid derivatives such as di-n-butyl sebacate, di(2-ethylhexyl) sebacate, diisodecyl sebacate, and di(2-butyloctyl) sebacate;

maleic acid derivatives such as di-n-butyl maleate, dimethyl maleate, diethyl maleate, and di(2-ethylhexyl) maleate;

fumaric acid derivatives such as di-n-butyl fumarate and di(2-ethylhexyl) fumarate;

citric acid derivatives such as triethyl citrate, tri-n-butyl citrate, acetyl triethyl citrate, and acetyl tri(2-ethylhexyl) citrate;

itaconic acid derivatives such as monomethyl itaconate, monobutyl itaconate, dimethyl itaconate, diethyl itaconate, dibutyl itaconate, and di(2-ethylhexyl) itaconate;

oleic acid derivatives such as butyl oleate, glyceryl monooleate, and diethylene glycol monooleate;

ricinoleic acid derivatives such as methyl acetyl ricinoleate, butyl acetyl ricinoleate, glyceryl monoricinoleate, and diethylene glycol monoricinoleate;

stearic acid derivatives such as n-butyl stearate and diethylene glycol di stearate (except 12-hydroxystearic acid ester);

other fatty acid derivatives such as diethylene glycol monolaurate, diethylene glycol dipelargonate, and pentaerythritol fatty acid esters;

phosphoric acid derivatives such as triethyl phosphate, tributyl phosphate, tri(2-ethylhexyl) phosphate, tributoxyethyl phosphate, triphenyl phosphate, cresyl diphenyl phosphate, tricresyl phosphate, trixylenyl phosphate, and tris (chloroethyl) phosphate;

glycol derivatives such as diethylene glycol dibenzoate, dipropylene glycol dibenzoate, triethylene glycol dibenzoate, triethylene glycol di(2-ethylbutyrate), triethylene glycol di(2-ethylhexanoate), and dibutyl methylenebisthioglycolate;

glycerin derivatives such as glycerol monoacetate, glycerol triacetate, and glycerol tributyrate;

epoxy derivatives such as epoxy hexahydro diisodecyl phthalate, epoxy triglyceride, epoxidized octyl oleate, and epoxidized decyl oleate; and polyester plasticizers such as adipic acid polyesters, sebacic acid polyesters, and phthalic acid polyesters.

Examples of so-called secondary plasticizers include epoxidized vegetable oils such as epoxidized soybean oil and epoxidized linseed oil; chlorinated paraffin; fatty acid esters of glycol such as triethylene glycol dicaprylate; butyl epoxy stearate; phenyl oleate; and methyl dihydroabietate.

Of the other plasticizers described above, epoxidized soybean oil is preferably used in combination with (b) the diester plasticizer and (c) the trimellitate plasticizer.

The amount of the other plasticizers described above relative to 100 parts by mass of (a) the vinyl chloride resin is preferably 0.1 parts by mass or more, more preferably 0.5 parts by mass or more, and further preferably 1 parts by mass or more, and preferably 30 parts by mass or less, more preferably 20 parts by mass or less, and further preferably 10 parts by mass or less. As a result of the amount of plasticizers other than (b) the diester plasticizer and (c) the trimellitate plasticizer being in the range described above, a vinyl chloride resin molded product formed through powder molding of the vinyl chloride resin composition can be provided with favorable flexibility at low temperatures.

<<Perchloric Acid-Treated Hydrotalcite>>

The perchloric acid-treated hydrotalcite that may be included in the vinyl chloride resin composition can be, as perchloric acid-introduced hydrotalcite, easily produced by, for example, addition and stirring of hydrotalcite with a dilute aqueous solution of perchloric acid, followed by filtration, dehydration, and drying as required. Through this process, at least some of the carbonate anions ($CO_3^{2-}$) in the hydrotalcite are substituted with perchlorate anions ($ClO_4^-$) (note that 2 mol of perchlorate anions are substituted per 1 mol of carbonate anions). The molar ratio of hydrotalcite and perchloric acid may be freely set, although a ratio of 0.1 mol or more and 2 mol or less of perchloric acid relative to 1 mol of hydrotalcite is typical.

The substitution ratio of carbonate anions in the untreated (unsubstituted with no introduction of perchlorate anions) hydrotalcite by perchlorate anions is preferably 50 mol % or more, more preferably 70 mol % or more, and particularly preferably 85 mol % or more. Moreover, the substitution ratio of carbonate anions in the untreated (unsubstituted with no introduction of perchlorate anions) hydrotalcite by perchlorate anions is preferably 95 mol % or less. As a result of the substitution ratio of carbonate anions in the untreated (unsubstituted with no introduction of perchlorate anions) hydrotalcite by perchlorate anions being in the range described above, a vinyl chloride resin molded product formed through powder molding of the vinyl chloride resin composition can be provided with favorable flexibility at low temperatures.

Hydrotalcite is a non-stoichiometric compound represented by a general formula: $[Mg_{1-x}Al_x(OH)_2]^{x+}[(CO_3)_{x/2}.mH_2O]^{x-}$, and is an inorganic substance having a layered crystal structure formed by a positively charged basic layer of $[Mg_{1-x}Al_x(OH)_2]^{x+}$ and a negatively charged intermediate layer of $[(CO_3)_{x/2}.mH_2O]^{x-}$. In the general formula shown above, x represents a number that is greater than 0 and no greater than 0.33. Natural hydrotalcite is represented by $Mg_6Al_2(OH)_{16}CO_3.4H_2O$. On the other hand, a synthetic hydrotalcite represented by $Mg_{4.5}Al_2(OH)_{13}CO_3.3.5H_2O$ is commercially available. Synthetic hydrotalcite can for example be synthesized by a method described in JP S61-174270 A.

The amount of the perchloric acid-treated hydrotalcite is not limited. The amount of the perchloric acid-treated hydrotalcite relative to 100 parts by mass of (a) the vinyl chloride resin is preferably 0.5 parts by mass or more, more preferably 1 parts by mass or more, and further preferably 1.5 parts by mass or more, and preferably 7 parts by mass or less, more preferably 6 parts by mass or less, and further preferably 5.5 parts by mass or less. As a result of the amount of the perchloric acid-treated hydrotalcite being in the range described above, a vinyl chloride resin molded product formed through powder molding of the vinyl chloride resin composition can be provided with favorable flexibility at low temperatures.

<<Zeolite>>

The vinyl chloride resin composition may include a zeolite as a stabilizer. A zeolite is a compound represented by a general formula: $M_{x/n}.[(AlO_2)_x.(SiO_2)_y].zH_2O$ (in the general formula, M is a metal ion of valency n, x+y is the number of tetrahedra per unit cell, and z is the number of moles of water). Examples of M in the general formula include monovalent and divalent metals such as Na, Li, Ca, Mg, and Zn, and mixtures thereof.

The amount of the zeolite is not limited. The amount of the zeolite relative to 100 parts by mass of (a) the vinyl chloride resin is preferably 0.1 parts by mass or more, and preferably 5 parts by mass or less.

<<β-Diketone>>

A β-diketone can be used to effectively suppress variation in initial color of a vinyl chloride resin molded product obtained through powder molding of the vinyl chloride resin composition. Specific examples of β-diketones include dibenzoylmethane, stearoylbenzoylmethane, and palmitoylbenzoylmethane. Any one of these β-diketones may be used alone or a combination of any two or more of these β-diketones may be used.

The amount of the β-diketone is not limited. The amount of the β-diketone relative to 100 parts by mass of (a) the vinyl chloride resin is preferably 0.1 parts by mass or more, and preferably 5 parts by mass or less.

<<Fatty Acid Metal Salt>>

The vinyl chloride resin composition may contain a fatty acid metal salt. The fatty acid metal salt is not limited, and may be any fatty acid metal salt. The fatty acid metal salt is preferably a metal salt of a monobasic fatty acid, more preferably a metal salt of a monobasic fatty acid having a carbon number of 12 to 24, and even more preferably a metal salt of a monobasic fatty acid having a carbon number of 15 to 21. Specific examples of the fatty acid metal salt include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. The metal in the fatty acid metal salt is preferably a metal that can produce polyvalent cations, more preferably a metal that can produce divalent cations, even more preferably a metal from periods 3 to 6 of the periodic table that can produce divalent cations, and particularly preferably a metal from period 4 of the periodic table that can produce divalent cations. The fatty acid metal salt is most preferably zinc stearate.

The amount of the fatty acid metal salt is not limited. The amount of the fatty acid metal salt relative to 100 parts by mass of (a) the vinyl chloride resin is preferably 0.05 parts by mass or more and more preferably 0.1 parts by mass or more, and preferably 5 parts by mass or less, more preferably 1 parts by mass or less, and further preferably 0.5 parts by mass or less. As a result of the amount of the fatty acid metal salt being in the range described above, a vinyl chloride resin molded product formed through powder molding of the vinyl chloride resin composition can be provided with favorable flexibility at low temperatures and a color difference value thereof can be reduced.

<<Other Dusting Agents>>

Examples of other dusting agents (powder fluidity modifiers) besides the vinyl chloride resin fine particles that may be included in the vinyl chloride resin composition include: inorganic fine particles such as calcium carbonate, talc, and aluminum oxide; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Among these examples, inorganic fine particles having an average particle diameter of 10 nm or more and 100 nm or less are preferable.

The amount of the other dusting agents is not limited. The amount of the other dusting agents relative to 100 parts by mass of (a) the vinyl chloride resin is preferably 30 parts by mass or less and more preferably 25 parts by mass or less, and may be 10 parts by mass or more. One of these other dusting agents may be used individually, or two or more of these other dusting agents may be used in combination. The other dusting agents may be used together with the aforementioned vinyl chloride resin fine particles.

<<Other Additives>>

Other additives that may be contained in the vinyl chloride resin composition are not limited. Examples include mold release agents, colorants (pigments), impact modifiers, perchloric acid compounds other than perchloric acid-treated hydrotalcite (for example, sodium perchlorate and potassium perchlorate), antioxidants, fungicides, flame retardants, antistatic agents, fillers, light stabilizers, and foaming agents.

Mold release agents are not limited. Examples include lubricants such as a 12-hydroxystearic acid oligomer.

Specific examples of colorants (pigments) include quinacridone pigments, perylene pigments, condensed polyazo pigments, isoindolinone pigments, copper phthalocyanine pigments, titanium white, and carbon black. Any one of these pigments or any two or more of these pigments may be used.

A quinacridone pigment is obtained through concentrated sulfuric acid treatment of a p-phenylene dianthranilic acid and has a hue from yellowish red to reddish purple. Specific examples of quinacridone pigments include quinacridone red, quinacridone magenta, and quinacridone violet.

A perylene pigment is obtained through a condensation reaction of perylene-3,4,9,10-tetracarboxylic anhydride and an aromatic primary amine and has a hue from red to red-purple/brown. Specific examples of perylene pigments include perylene red, perylene orange, perylene maroon, perylene vermilion, and perylene bordeaux.

A condensed polyazo pigment is obtained through condensation of an azo pigment in a solvent to achieve a high molecular weight and has a hue of a yellow or red pigment. Specific examples of condensed polyazo pigments include polyazo red, polyazo yellow, chromophthal orange, chromophthal red, and chromophthal scarlet.

An isoindolinone pigment is obtained through a condensation reaction of 4,5,6,7-tetrachloroisoindolinone and an aromatic primary diamine and has a hue from greenish yellow to red/brown. A specific example of an isoindolinone pigment is isoindolinone yellow.

A copper phthalocyanine pigment is a pigment in which copper is coordinated with a phthalocyanine and has a hue from yellowish green to bright blue. Specific examples of copper phthalocyanine pigments include phthalocyanine green and phthalocyanine blue.

Titanium white is a white pigment made from titanium dioxide. Titanium white has high opacity and exists in anatase form and rutile form.

Carbon black is a black pigment having carbon as a main component and also including oxygen, hydrogen, and nitrogen. Specific examples of carbon black include thermal black, acetylene black, channel black, furnace black, lamp black, and bone black.

Specific examples of impact modifiers include an acrylonitrile-butadiene-styrene copolymer, a methyl methacrylate-butadiene-styrene copolymer, a chlorinated polyethylene, an ethylene-vinyl acetate copolymer, and a chlorosulfonated polyethylene. One impact modifier or two or more impact modifiers may be used in the vinyl chloride resin composition. Note that the impact modifier is dispersed as a heterogeneous phase of fine elastic particles in the vinyl chloride resin composition. In the vinyl chloride resin composition, polar groups and chains graft polymerized with the elastic particles are compatible with (a) the vinyl chloride resin and improve impact resistance of the vinyl chloride resin molded product obtained using the vinyl chloride resin composition.

Specific examples of antioxidants include phenolic antioxidants, sulfuric antioxidants, and phosphoric antioxidants such as phosphite.

Specific examples of fungicides include aliphatic ester-based fungicides, hydrocarbon-based fungicides, organic nitrogen-based fungicides, and organic nitrogen sulfur-based fungicides.

Specific examples of flame retardants include halogen-containing flame retardants such as chlorinated paraffin; phosphoric flame retardants such as phosphoric acid esters; and inorganic hydroxides such as magnesium hydroxide and aluminum hydroxide.

Specific examples of antistatic agents include anionic antistatic agents such as fatty acid salts, higher alcohol sulfuric acid esters, and sulfonic acid salts; cationic antistatic agents such as aliphatic amine salts and quaternary ammonium salts; and non-ionic antistatic agents such as polyoxyethylene alkyl ethers and polyoxyethylene alkyl phenol ethers.

Specific examples of fillers include silica, talc, mica, calcium carbonate, and clay.

Specific examples of light stabilizers include ultraviolet absorbers based on benzotriazoles, benzophenone, and nickel chelate, and hindered amine light stabilizers.

Specific examples of foaming agents include organic foaming agents such as azo compounds (for example, azodicarbonamides and azobisisobutyronitrile), nitroso compounds (for example, N,N'-dinitrosopentamethylenetetramine), and sulfonyl hydrazide compounds (for example p-toluenesulfonyl hydrazide and p,p-oxybis(benzenesulfonyl hydrazide)); and gaseous foaming agents such as chlorofluorocarbons, carbon dioxide gas, water, and volatile hydrocarbon compounds (for example, pentane), and microcapsules containing any of these gaseous foaming agents.

Production Method of Vinyl Chloride Resin Composition

The presently disclosed vinyl chloride resin composition can be produced by mixing the components described above.

No specific limitations are placed on the method used to mix (a) the vinyl chloride resin, (b) the diester plasticizer, (c) the trimellitate plasticizer, and additives used as required. One example of the mixing method involves mixing the components with the exception of the dusting agent including the vinyl chloride resin fine particles by dry blending and subsequently mixing in the dusting agent. The dry blending is preferably carried out using a Henschel mixer. The temperature during dry blending is not limited, and is preferably 50° C. or more and more preferably 70° C. or more, and preferably 200° C. or less.

<<Blending Amount of Plasticizer>>

Regarding the blending amount of each plasticizer, the total amount of (b) the diester plasticizer and (c) the trimellitate plasticizer relative to 100 parts by mass of (a) the vinyl chloride resin is preferably 5 parts by mass or more, more preferably 30 parts by mass or more, and further preferably 50 parts by mass or more, and preferably 200 parts by mass or less, more preferably 180 parts by mass or less, and further preferably 150 parts by mass or less. As a result of the total amount of (b) the diester plasticizer and (c) the trimellitate plasticizer being 5 parts by mass or more, a vinyl chloride resin molded product obtained by powder molding the vinyl chloride resin composition can be provided with favorable flexibility at low temperatures. As a result of the total amount of (b) the diester plasticizer and (c) the trimellitate plasticizer being 200 parts by mass or less, favorable strength of the vinyl chloride resin molded product can be maintained easily.

Regarding the blending ratio of (b) the diester plasticizer and (c) the trimellitate plasticizer (diester plasticizer/trimellitate plasticizer), the diester plasticizer is preferably blended with a mass ratio of 1/99 or more, more preferably blended with a mass ratio of 4/96 or more, further preferably blended with a mass ratio of 6/94 or more, and preferably blended with a mass ratio of 99/1 or less, more preferably blended with a mass ratio of 40/60 or less, and further preferably blended with a mass ratio of 30/70 or less. As a result of the diester plasticizer being blended so that the diester plasticizer/trimellitate plasticizer is 1/99 or more, the control of the flexibility at low temperatures of a vinyl chloride resin molded product obtained by powder molding the vinyl chloride resin composition can be facilitated. As a result of the diester plasticizer being blended so that the diester plasticizer/trimellitate plasticizer is 99/1 or less, the control of the flexibility at low temperatures of the vinyl chloride resin molded product can be further facilitated while favorably maintaining its strength at low temperatures.

Vinyl Chloride Resin Molded Product

A presently disclosed vinyl chloride resin molded product is obtained through powder slush molding of the vinyl chloride resin composition described above. Since the presently disclosed vinyl chloride resin molded product is produced using the presently disclosed vinyl chloride resin composition, the vinyl chloride resin molded product is excellent in both flexibility and strength at low temperatures. The presently disclosed vinyl chloride resin molded product is therefore suitable for use as an automobile interior material, e.g. an automobile interior material for an automobile interior part such as a surface skin of an instrument panel, a door trim, or the like, and particularly suitable for use as a surface skin of an automobile instrument panel.

<<Method of Molding Vinyl Chloride Resin Molded Product>>

The mold temperature during powder slush molding is not limited, and is preferably 200° C. or more and more preferably 220° C. or more, and preferably 300° C. or less and more preferably 280° C. or less.

In production of the vinyl chloride resin molded product, for example, the following method may be used without being limited thereto: The presently disclosed vinyl chloride resin composition is sprinkled onto a mold having a temperature in the aforementioned range. The vinyl chloride resin composition is initially left for 5 seconds or more and 30 seconds or less and, after shaking off any excess vinyl chloride resin composition, is then further left for 30 seconds or more and 3 minutes or less at a given temperature. The mold is subsequently cooled to 10° C. or more and 60° C. or less, and the presently disclosed vinyl chloride resin molded product obtained thereby is removed from the mold. The removed vinyl chloride resin molded product is, for example, yielded as a sheet-like molded product having the shape of the mold.

Laminate

A presently disclosed laminate is obtainable by, for example, stacking the presently disclosed vinyl chloride resin molded product with a foamed polyurethane molded product. Since the presently disclosed laminate is produced using the presently disclosed vinyl chloride resin composition, the vinyl chloride resin molded product is excellent in both flexibility and strength at low temperatures. The presently disclosed laminate is therefore suitable for use as an automobile interior material, e.g. an automobile interior material for an automobile interior part such as an instrument panel or a door trim, and particularly suitable for use as an automobile instrument panel.

The stacking method is not limited. Examples of stacking methods that can be adopted include: (1) a method in which the foamed polyurethane molded product and the vinyl chloride resin molded product are prepared separately and are subsequently joined together by, for example, thermal fusion bonding, thermal adhesion, or using a commonly known adhesive; and (2) a method in which raw materials of the foamed polyurethane molded product such as an isocyanate and a polyol are caused to react on the vinyl chloride resin molded product so as to polymerize while carrying out polyurethane foaming by a commonly known method to directly form the foamed polyurethane molded product on the vinyl chloride resin molded product. The latter method (2) is more suitable because it involves a simple process and enables laminates of various different shapes to be obtained while facilitating firm adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the tensile stress at low temperatures, the tensile breaking elongation at low temperatures, and the loss modulus peak top temperature of each produced vinyl chloride resin molded product.

Tensile Stress

The strength of each vinyl chloride resin molded product was evaluated by measuring tensile stress by a tensile test as one index. In detail, a produced vinyl chloride resin molded sheet was punched with a No. 1 dumbbell prescribed by JIS K6251, and the maximum tensile stress (MPa) was measured in accordance with JIS K7113 at a tension rate of 200 mm/minute and at −35° C. The results are shown in Table 1.

Tensile Breaking Elongation

The strength and flexibility of each vinyl chloride resin molded product were evaluated by measuring tensile breaking elongation by a tensile test as one index. In detail, a produced vinyl chloride resin molded sheet was punched with a No. 1 dumbbell prescribed by JIS K6251, and the tensile breaking elongation (%) was measured in accordance with JIS K7113 at a tension rate of 200 mm/minute and at −35° C.

Higher tensile breaking elongation indicates better strength and flexibility of the vinyl chloride resin molded product at low temperatures. The results are shown in Table 1.

Loss Modulus Peak Top Temperature

The flexibility of each vinyl chloride resin molded product was evaluated by measuring a loss modulus peak top temperature by a dynamic viscoelasticity test as one index. In detail, an obtained vinyl chloride resin molded sheet was punched to dimensions of width 10 mm×length 40 mm, to yield a measurement sample. Then, the loss modulus peak top temperature (° C.) of the measurement sample was measured in accordance with JIS K7244-4 at a frequency of 10 Hz, a heating rate of 2° C./minute, and a measurement temperature range of −90° C. to +100° C.

A lower peak top temperature indicates better flexibility of the vinyl chloride resin molded product at low temperatures. The results are shown in Table 1.

Example 1

Preparation of 1,6-hexanediol Diester Plasticizer

A four-neck flask equipped with a stirrer, a thermometer, a nitrogen gas blowing tube, and a moisture fractional distillation receiver including a condenser was charged with 0.59 parts by mass of 1,6-hexanediol, 2.97 parts by mass of oleic acid, 5 mass % of xylene relative to the total charged mass, and 0.2 mass % of p-toluenesulfonic acid relative to the total charged mass. An esterification reaction was carried out at a temperature of 200° C. until the theoretical amount of produced water had collected in the moisture fractional distillation receiver.

After the reaction, excess acid and xylene were removed by distillation to obtain an esterified crude product. Next, the resultant esterified crude product was neutralized by a saturated aqueous solution of sodium hydrogen carbonate and was washed with water until neutral.

Thereafter, the water-washed esterified crude product was treated with activated carbon and the activated carbon was removed by filtration, to yield a 1,6-hexanediol diester plasticizer including 2.59 parts by mass of a 1,6-hexanediol diester compound as a diester plasticizer.

In the obtained 1,6-hexanediol diester compound, the carbon numbers of $R_1$ and $R_3$ were 17, and the carbon number of $R_2$ was 6. The resultant 1,6-hexanediol diester plasticizer had an acid value of 0.4 mgKOH/g and a saponification value of 177 mgKOH/g.

Preparation of Vinyl Chloride Resin Composition

Ingredients shown in Table 1 with the exception of the plasticizers (trimellitate plasticizer, 1,6-hexanediol diester plasticizer, and epoxidized soybean oil) and emulsion polymerized vinyl chloride resin fine particles used as the dusting agent were added into a Henschel mixer and mixed. All of the plasticizers were added to the mixture after increasing the temperature of the mixture to 80° C. and, by further heating, the mixture was dried up (i.e., the aforementioned mixture changed to a dry state through absorption of the plasticizers by vinyl chloride resin particles used as the vinyl chloride resin). Thereafter, once the dried-up mixture had been cooled to a temperature of 100° C. or lower, the emulsion polymerized vinyl chloride resin fine particles used as the dusting agent were added to the mixture to produce a vinyl chloride resin composition.

In the trimellitate compound as the trimellitate plasticizer used in preparation of the vinyl chloride resin composition, the total percentage amount of alkyl groups having a carbon number of 8 relative to the total alkyl groups of $R_4$, $R_5$, and $R_6$ was 100 mol %.

The straight chain ratios of $R_4$, $R_5$, and $R_6$ of the trimellitate compound included in the obtained vinyl chloride resin composition were all 0 mol %. The straight chain ratio of $R_2$ and the total straight chain ratio of $R_1$ and $R_3$ of the 1,6-hexanediol diester compound included in the obtained vinyl chloride resin composition were all 100 mol %.

Production of Vinyl Chloride Resin Molded Product

The resultant vinyl chloride resin composition was sprinkled onto a textured mold that was heated to a temperature of 250° C. and, after being left to melt for a given time of about 10 seconds to 20 seconds, excess vinyl chloride resin composition was shaken off. Next, the textured mold sprinkled with the vinyl chloride resin composition was placed in an oven set to a temperature of 200° C. and, once 60 seconds had passed from the placement, was cooled with cooling water. Once the mold had cooled to 40° C., a vinyl chloride resin molded sheet of 145 mm×175 mm×1 mm was removed from the mold as a vinyl chloride resin molded product.

The tensile stress at low temperatures, the tensile breaking elongation at low temperatures, and the loss modulus peak top temperature of the resultant vinyl chloride resin molded sheet were measured by the methods mentioned above. The results are shown in Table 1.

Example 2

A 1,6-hexanediol diester plasticizer, a vinyl chloride resin composition, and a vinyl chloride resin molded sheet were produced in the same way as in Example 1 with the exception that, in preparation of the vinyl chloride resin composition, the blending amount of the trimellitate plasticizer was changed to 90 parts by mass and the blending amount of the 1,6-hexanediol diester plasticizer was changed to 10 parts by mass as in the ingredients shown in Table 1.

The measurement and evaluation were performed by the same methods as in Example 1. The results are shown in Table 1.

Comparative Example 1

A vinyl chloride resin composition and a vinyl chloride resin molded sheet were produced in the same way as in Example 1 with the exception that, in preparation of the vinyl chloride resin composition, a 1,6-hexanediol diester plasticizer was not used, and the blending amount of the trimellitate plasticizer was changed to 100 parts by mass.

The measurement and evaluation were performed by the same methods as in Example 1. The results are shown in Table 1.

Comparative Example 2

A 1,6-hexanediol diester plasticizer, a vinyl chloride resin composition, and a vinyl chloride resin molded sheet were produced in the same way as in Example 1 with the exception that, in preparation of the vinyl chloride resin composition, the type of the trimellitate plasticizer was changed to a plasticizer whose straight chain ratios of $R_4$, $R_5$, and $R_6$ in formula (2) were 100 mol %.

The measurement and evaluation were performed by the same methods as in Example 1. The results are shown in Table 1.

Comparative Example 3

A 1,6-hexanediol diester plasticizer, a vinyl chloride resin composition, and a vinyl chloride resin molded sheet were produced in the same way as in Example 2 with the exception that, in preparation of the vinyl chloride resin composition, the type of the trimellitate plasticizer was changed to a plasticizer whose straight chain ratios of $R_4$, $R_5$, and $R_6$ in formula (2) were 100 mol %.

The measurement and evaluation were performed by the same methods as in Example 1. The results are shown in Table 1.

TABLE 1

|  |  |  | Example 1 | Example 2 | Comparative Example 1 | Comparative Example 2 | Comparative Example 3 |
|---|---|---|---|---|---|---|---|
| Vinyl chloride resin composition | Substrate | Vinyl chloride resin particles[1] [parts by mass] | 100.0 | 100.0 | 100.0 | 100.0 | 100.0 |
|  | Plasticizer | Trimellitate (straight chain ratio: less than 90 mol %)[2] [parts by mass] | 95.0 | 90.0 | 100.0 | — | — |
|  |  | Trimellitate (straight chain ratio: 90 mol % or more)[3] [parts by mass] | — | — | — | 95.0 | 90.0 |
|  |  | 1,6-hexanediol diester [parts by mass] | 5.0 | 10.0 | — | 5.0 | 10.0 |
|  |  | Epoxidized soybean oil[4] [parts by mass] | 5.0 | 5.0 | 5.0 | 5.0 | 5.0 |
|  | Stabilizer | Perchloric acid-introduced hydrotalcite[5] [parts by mass] | 4.5 | 4.5 | 4.5 | 4.5 | 4.5 |
|  |  | Zeolite[6] [parts by mass] | 2.4 | 2.4 | 2.4 | 2.4 | 2.4 |
|  |  | β-diketone[7] [parts by mass] | 0.5 | 0.5 | 0.5 | 0.5 | 0.5 |
|  |  | Zinc stearate[8] [parts by mass] | 0.2 | 0.2 | 0.2 | 0.2 | 0.2 |
|  | Mold release agent | 12-hydroxystearic acid[9] [parts by mass] | 0.4 | 0.4 | 0.4 | 0.4 | 0.4 |
|  | Dusting agent | Vinyl chloride resin fine particles[10] [parts by mass] | 15.0 | 15.0 | 15.0 | 15.0 | 15.0 |
|  | Pigment | Carbon black pigment[11] [parts by mass] | 4.0 | 4.0 | 4.0 | 4.0 | 4.0 |
| Evaluation category |  | Tensile stress (−35° C.) [MPa] | 25.0 | 25.3 | 24.8 | 24.2 | 23.5 |
|  |  | Tensile breaking elongation (−35° C.) [%] | 130 | 150 | 110 | 160 | 160 |
|  |  | Loss modulus peak top temperature [° C.] | −33 | −39 | −29 | −45 | −47 |

1) product name "ZEST 1300S" produced by Shin Dai-ichi Vinyl Corporation (suspension polymerization, average degree of polymerization: 1300, average particle diameter: 113 μm)

2) product name "TOTM" produced by Mitsubishi Gas Chemical Company, Inc. (straight chain ratios of $R_4$, $R_5$, and $R_6$: all 0 mol %)

3) product name "TRIMEX N-08" produced by Kao Corporation (straight chain ratios of $R_4$, $R_5$, and $R_6$: all 100 mol %)

4) product name "ADK CIZER O-130S" produced by ADEKA Corporation 5) product name "ALCAMIZER 5" produced by Kyowa Chemical Industry Co., Ltd.

6) product name "MIZUKALIZER DS" produced by Mizusawa Industrial Chemicals, Ltd.

7) product name "Karenz DK-1" produced by Showa Denko K.K.

8) product name "SAKAI SZ-2000" produced by Sakai Chemical Industry Co., Ltd.

9) product name "ADK STAB LS-12" produced by ADEKA Corporation 10) product name "ZEST PQLTX" produced by Shin Dai-ichi Vinyl Corporation (emulsion polymerization, average degree of polymerization: 800, average particle diameter: 2 μm)

11) product name "DA PX 1720(A) Black" produced by Dainichiseika Color and Chemicals Mfg. Co., Ltd.

As can be understood from Table 1, in the vinyl chloride resin molded products of Examples 1 and 2 in which the trimellitate plasticizer whose straight chain ratios of $R_4$, $R_5$, and $R_6$ in formula (2) were all less than 90 mol % and the 1,6-hexanediol diester plasticizer were used in combination, the tensile breaking elongation at low temperatures and the loss modulus peak top temperature were significantly improved with an increase in the blending amount of the 1,6-hexanediol diester plasticizer, as compared with Comparative Example 1 in which the 1,6-hexanediol diester plasticizer was not used and Comparative Examples 2 and 3 in which the straight chain ratios were all 90 mol % or more.

This demonstrates that the strength and flexibility at low temperatures of the vinyl chloride resin molded product can be controlled by combined use of the predetermined trimellitate plasticizer with a low straight chain ratio and the predetermined diester plasticizer.

INDUSTRIAL APPLICABILITY

It is thus possible to provide a vinyl chloride resin composition that enables such control that achieves both excellent strength and excellent flexibility at low temperatures of a vinyl chloride resin molded product and a laminate suitable for production of, for example, an automobile instrument panel.

The invention claimed is:

1. A vinyl chloride resin composition comprising:
   (a) a vinyl chloride resin;
   (b) a diester plasticizer formed from a compound represented by the following formula (1)

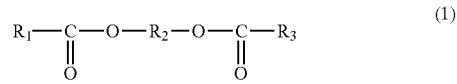

where $R_1$ and $R_3$ are monovalent hydrocarbon groups that may be the same or different, the carbon number of the monovalent hydrocarbon group of $R_1$ is 10 or more, the carbon number of the monovalent hydrocarbon group of $R_3$ is 10 or more, and $R_2$ is a divalent hydrocarbon group; and (c) a trimellitate plasticizer formed from a compound represented by the following formula (2):

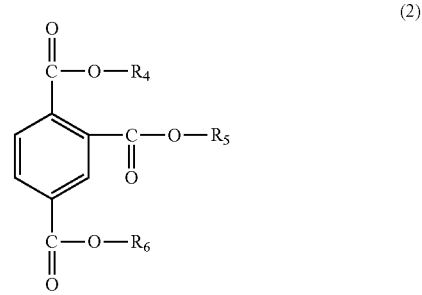

where $R_4$, $R_5$, and $R_6$ are alkyl groups that may be the same or different, and a straight chain ratio of each of $R_4$, $R_5$, and $R_6$ is less than 50 mol %.

2. The vinyl chloride resin composition according to claim 1, wherein, relative to a total of the alkyl groups of $R_4$, $R_5$, and $R_6$ in the formula (2):

a total proportion of alkyl groups having a carbon number of 7 or less is 0 mol % or more and 10 mol % or less;

a total proportion of alkyl groups having a carbon number of 8 and a carbon number of 9 is 5 mol % or more and 100 mol % or less;

a proportion of an alkyl group having a carbon number of 10 is 0 mol % or more and 95 mol % or less; and a total proportion of alkyl groups having a carbon number of 11 or more is 0 mol % or more and 10 mol % or less.

3. The vinyl chloride resin composition according to claim 1, wherein a total blending amount of (b) the diester plasticizer and (c) the trimellitate plasticizer relative to 100 parts by mass of (a) the vinyl chloride resin is 5 parts by mass or more and 200 parts by mass or less.

4. The vinyl chloride resin composition according to claim 1, wherein a blending ratio of (b) the diester plasticizer relative to (c) the trimellitate plasticizer, expressed as a mass ratio, is from 1/99 to 99/1.

5. The vinyl chloride resin composition according to claim 1, wherein $R_1$ and $R_3$ in the formula (1) are monovalent aliphatic hydrocarbon groups having a carbon number of 2 to 24, and $R_2$ in the formula (1) is a divalent aliphatic hydrocarbon group having a carbon number of 2 to 15.

6. The vinyl chloride resin composition according to claim 1, wherein a straight chain ratio of $R_2$ in the formula (1) is 90 mol % or more, and a total straight chain ratio of $R_1$ and $R_3$ in the formula (1) is 90 mol % or more.

7. The vinyl chloride resin composition according to claim 1, wherein (a) the vinyl chloride resin is vinyl chloride resin particles.

8. The vinyl chloride resin composition according to claim 7 used in powder molding.

9. The vinyl chloride resin composition according to claim 7 used in powder slush molding.

10. A vinyl chloride resin molded product obtainable through powder slush molding of the vinyl chloride resin composition according to claim 7.

11. The vinyl chloride resin molded product according to claim 10 used as a surface skin of an automobile instrument panel.

12. A laminate comprising:

a foamed polyurethane molded product; and the vinyl chloride resin molded product according to claim 10.

13. The vinyl chloride resin composition according to claim 1, wherein, relative to a total of the alkyl groups of $R_4$, $R_5$, and $R_6$ in the formula (2):

a total proportion of alkyl groups having a carbon number of 8 and a carbon number of 9 is 100 mol %.

* * * * *